United States Patent Office 2,742,489
Patented Apr. 17, 1956

2,742,489

DEHYDRATING AND DEFATTING ANIMAL TISSUES

Frederick G. Low, Unionville, Pa., assignor to E. I. du Pont de Nemours and Company, Wilmington, Del., a corporation of Delaware No Drawing. Application May 29, 1951, Serial No. 228,963

13 Claims. (Cl. 260—412.6)

This invention relates to an improved method for dehydrating and defatting animal tissue, using a water-immiscible fat solvent.

Meat products such as packing house and butchers' wastes, inedible cuttings, dead stock and the like, are processed commercially to recover their fat and protein values by well-known "wet-rendering" and "dry-rendering" methods. In the former, separation of the fat from the protein is accomplished by cooking in the presence of water, while in the latter meat cuttings or the like are heated to vaporize the water and simultaneously liquefy the fat which is run off. These methods are costly, time-consuming and inefficient. Moreover, because of the severe conditions to which the animal tissues are subjected, products of inferior quality are obtained.

Solvent rendering or extraction methods have also been proposed for recovering fat from animal tissues. Such methods have generally involved charging the raw meat in chopped or ground condition into a steam jacketed vessel containing a water-immiscible fat solvent such as trichlorethylene, perchlorethylene, ethylene dichloride, hexane, heptane, toluene or xylene. Steam is then admitted to the jacket and the solvent-meat mixture is distilled until most of the water originally present as part of the meat has been removed as a vaporized mixture of water and solvent. This distillation treatment leaves a mixture of dried meat solids and a solution of fat in excess solvent which is processed to recover fat and dried defatted tissue as final products.

Solvent rendering methods of the above type have been used only to a limited extent because of the tendency of masses of comminuted raw animal tissue to stick together and agglomerate when heated in the solvent. Thus, raw ground meat forms large lumps during the distillation step of such processes and when the water is vaporized from the surface of these lumps a tough dried outer layer is formed which acts as an insulating layer and greatly reduces the rate at which the interior of the lumps become heated, dried and defatted. Formation of such lumps greatly reduces equipment capacity, due to the longer processing time required, and results in product of inferior quality due to the long exposure to high temperature.

One object of this invention is to provide an improved method for dehydrating and defatting raw, fat-containing animal tissue which also contains substantial amounts of water. A further object is to provide a method for treating such tissue with a water-immiscible fat solvent whereby the tissue is rapidly and effectively dehydrated and simultaneously defatted. Other objects of the invention will be apparent from the following description.

The objects of the invention are accomplished by forming a mass of comminuted raw animal tissue containing both fat and water into a thin-bodied shape having a thickness not greater than ¾ in. and passing the shaped mass into a body of a water-immiscible fat solvent maintained under distillation conditions such that the distillation temperature is at least 60° C., preferably higher. The shaped mass of comminuted tissue can be passed directly into the boiling body of liquid solvent, or it can be passed first through the vapor zone above the boiling liquid and then into the latter. Distillation of the resulting mixture is then continued until substantially all of the water has been removed from the tissue as a mixture of water and solvent vapors which is condensed. After removal of the water, the dehydrated and defatted tissue is separated from the resulting solution of fat in excess solvent. Recovery of the fat from this solution may finally be accomplished by any desired method.

It has been discovered that when a thin-bodied mass of comminuted tissue having a thickness not greater than ¾ in. is passed into the boiling solvent under the conditions stated, the surfaces of the mass are almost instantly coagulated or "seared" by the action of the hot solvent so that, thereafter, there is no tendency for such masses to stick together and form thicker-bodied masses. Dehydration of the thin-bodied mass and extraction of fat therefrom by the action of the boiling solvent start immediately. Due to the thinness of the mass these dehydrating and defatting actions proceed simultaneously, rapidly and effectively. Generally, the tissue will have become dehydrated and defatted to the desired extent in less than about 30 minutes time, e. g., 10 to 20 minutes.

It has been further discovered that masses of comminuted raw animal tissue having a thickness substantially greater than ¾ in. require a much longer time to dehydrate and defat the mass throughout and that the searing action of the hot solvent on the outer surfaces forms a tough layer which greatly inhibits action of the solvent upon the inner portion of the mass. With such thick-bodied forms, the inner portions thereof are dehydrated and defatted at a rate much too slow for practical purposes.

The initial, substantially instantaneous searing of the thin-bodied mass of tissue produces a rather tough exterior offering some resistance to fragmentation which results in rather large pieces being present in the vessel in which dehydration and defatting are carried out. However, as drying proceeds, such toughness disappears and when the mass is substantially dry it is quite friable and disintegrates to some extent upon being agitated. The boiling action of the solvent is frequently adequate to effect sufficient disintegration for ready removal of the solids from the distilling vessel, but mechanical agitation is more effective and is preferably employed. Although generally desirable, it is not essential that the dried thin-bodied mass be so disintegrated and the process can be effectively practiced without the use of mechanical agitation and without the mass being disintegrated to any substantial extent since it will normally be ground in subsequent treatments such as the removal of solvent and processing for use as a foodstuff.

The amount of solvent present in the mixture being distilled should at all times be at least sufficient to give a mixture which can be readily agitated. An excess over that amount of solvent is generally desirable. If only sufficient solvent is used to permit agitation of the resulting mixture, it will be necessary to supply solvent during the distillation at a rate at least equal to the rate at which solvent is removed by distillation. This may be accomplished by adding fresh solvent as required or by recycling the solvent phase of the condensate. In general, at least one part by volume of solvent per one of tissue should be present in the mixture being distilled and it will usually be most practical to employ 3 to 7 parts of solvent to one part of tissue. Larger amounts of solvent can be used and may at times be desirable, particularly if solvent is not added or recycled during the distillation.

In batch operations, the distillation temperature during the initial drying stage will be substantially below the normal boiling temperature of the solvent, but not lower than the boiling temperature of an equilibrium mixture of the solvent and water. As drying proceeds, the temperature will rise quite rapidly to substantially the normal boiling temperature of the solvent. At that stage distillation may be discontinued and the dried tissue will be found to have been substantially completely defatted by the action of the excess solvent. Thus, if the tissue is separated from the mixture at that stage substantially the only fat remaining in the tissue will be that in solution in the solvent wetting the tissue. This small amount of fat may be readily recovered by simply washing the filtered tissue one or more times with fresh solvent.

Residual solvent in the treated and washed tissue may be removed and recovered if desired by well-known methods, e. g., by heating or by steam or air stripping, to obtain meal suitable for feeding or other purposes. Stripping at low temperatures, e. g., by using reduced pressures, aids in preventing decomposition of valuable components of the meal. Recovery of stripped solvent vapors may be effected by condensation and/or adsorption methods.

The fat solution separated from the treated tissue, e. g., by drainage, filtration, centrifuging or similar methods, is distilled to remove the solvent. Distillation can be effected at any desired pressure, sub-atmospheric pressures being recommended if the extracted fat is adversely affected by elevated temperatures. The separated fat or oil, may be treated to remove therefrom trace amounts of solvent by steam or air stripping, e. g., at reduced pressure if desired.

The dilute fat solution obtained by washing treated tissue with fresh solvent as described above, may be separately distilled to recover its fat and solvent values. Alternatively, it can be combined with the fat solution originally separated from the defatted tissue and the combined solutions then processed as described above. It will frequently be convenient and most practical to employ the washings in lieu of fresh solvent in the original dehydrating and defatting step.

In one modification of the invention, comminuted raw animal tissue is formed into individual pieces no dimension of which exceeds ¾ in. Such pieces are then dropped into the boiling solvent. Preferably, the comminuted tissue is formed into a shape having a thickness not greater than ¾ in. and a length and/or width at least several times its thickness. This can be accomplished by extruding a mass of ground or comminuted tissue through a suitable die such as will form the mass into a sheet, rod, ribbon, tube or the like. Also, the ground mass of meat may be rolled into sheets or patties of the required thinness. The particular shape of the thin-bodied mass is not important so long as its thickness does not exceed ¾ in. when it is contacted with the boiling solvent. Preferably, the thickness will be about 1/16 in. to ½ in. The tissue in the shaped form is passed through the vapor space above the boiling solvent and then directly into the body of boiling solvent. A particularly convenient procedure is to mount an ordinary meat grinder on the distillation vessel directly above the body of liquid solvent so that the spaghetti-like strings of ground meat as they emerge from the grinding head fall freely through the vapor space into the boiling solvent. In this instance, the grinder functions both to comminute the tissue and to form the comminuted tissue into the required thin-bodied mass.

The invention can be practiced employed any apparatus comprising a distillation vessel in which a mixture of the solvent and tissue can be distilled and which permits addition of thin-bodied masses of comminuted animal tissue to the boiling solvent. The distillation vessel may be of the jacketed type with provision for admitting heating fluid to the jacket. It may also be provided with open and/or closed steam coils for heating purposes. A condenser and receiver will be included and a separator for separating the solvent phase of the condensate for recycling to the still will preferably be provided. The distillation vessel will preferably be provided with an agitator and will include provisions for adding fresh or recycle solvent and for withdrawing the contents of the vessel. A filter may also be included to permit the separate withdrawal of the fat-solvent phase of the charge. Washing of the treated tissue can be effected in the distillation vessel, as can also distillation of the fat solution to separate solvent from the extracted fat. However, auxiliary equipment may conveniently be provided for such operations.

The method can be practiced batchwise, as already indicated, or continuously. In continuous operations, the comminuted tissue may be extruded continuously in the form of a thin-bodied mass into boiling solvent in a distillation zone through which solvent is passed either concurrently or countercurrently with the direction of travel of the tissue being treated. This distillation zone can be an integral part of a continuous extraction system.

The time of residence of the tissue in the distillation zone should be sufficient to effect the desired dehydration, and the tissue and the solution of fat in solvent, after they have passed the distillation zone, can be continuously separated from the system for further processing.

The invention is further illustrated by the following examples.

*Example 1*

A mixture of raw beef and pork trimmings was comminuted in a meat grinder having a grinder head with ⅛ in. holes. The ground mixture was rolled into a sheet about ¼ in. thick. The sheet was lowered endwise through a body of perchlorethylene vapors and into a lower body of boiling perchlorethylene contained in an ordinary open-top vapor degreaser. The surfaces of the sheet were rapidly seared and made tough by the contact with the hot vapors and liquid solvent. However, the sheet soon became friable. After only 10 to 20 minutes in the boiling solvent, the treated meat was removed and washed with fresh solvent. The washed material contained only about 5% water and about 3% fat.

*Example 2*

Raw butcher shop trimmings were proud and treated as described in Example 1 with substantially the same results.

*Example 3*

A ground mixture of raw beef and pork, such as is used for "Hamburg" steaks, was shaped into patties 4 to 5 in. in diameter and ¼ in. thick. The patties were dropped separately into a boiling body of perchlorethylene. Boiling of the perchlorethylene was continued for about 15 minutes after which the patties were removed and washed with fresh solvent. The moisture and fat contents of the treated material were about 5% and 3%, respectively. When using patties having a thickness substantially greater than ¾ in., i. e., about 1 in. thick, the patties were still teaming and their centers were still raw even after 1 hour in the boiling solvent.

The invention may be practiced using any water-immiscible fat solvent whose mixture with water boils under equilibrium conditions at a temperature of at least 60° C. at the pressure employed. Examples of suitable solvents are trichlorethylene perchlorethylene, ethylene dichloride, carbontetrachloride, hexane, heptane, toluene and xylene. The chlorinated hydrocarbons such as trichlorethylene, perchlorethylene and ethylene dichloride are preferred solvents because of their nonflammability and excellent dissolving power for fats and oils.

When the thin-bodied mass of tissue is passed into the boiling solvent, the surfaces of the mass are immediately subjected to a temperature ranging from the boiling point of the water-solvent mixture and that of the pure solvent. In order that the boiling solvent will substantially instantly coagulate or sear the surfaces of the thin-bodied mass of tissue, the solvent used should be one whose mixture with water boils under equilibrium conditions at the pressure employed at a temperature at least as high as 60° C. Preferably, the solvent is one whose mixture with water boils under equilibrium conditions at a temperature of at least 80° C., e. g., 80 to 95° C. Water-immiscible solvents whose normal boiling points, rather than the boiling points of their mixtures with water, range from about 75° C. to about 130° C. are generally suitable. Perchlorethylene which boils at 121° C. and whose mixture with water boils at 87.7° C. is almost ideally suited for use at atmospheric or somewhat reduced pressures. Pressures either above or below atmospheric pressures can be used during the dehydrating and defatting stage so long as the resulting distillation temperature is at least 60° C. but not so high as to damage the material being treated.

Any raw animal tissue such as meat, packing house and butchers' wastes, inedible cuttings, fish, dead stock, glandular tissue and the like, may be dehydrated and defatted by the present method. In practicing the invention, distillation of the tissue-solvent mixture usually will be continued until the moisture content of the tissue is less than about 8%, which point in batch operations can be determined by the rise in the boiling point of the mixture toward the normal boiling point of the solvent. Distillation may of course be continued beyond that point or may be stopped short thereof if desired. In most operations, the method will effectively and rapidly reduce the moisture content to 5% or below and the fat content to any desired value, e. g., to about 3% or less.

I claim:

1. In a process for simultaneously removing water and fat from animal tissue, the improvement comprising: (1) a first step of comminuting said tissue; (2) a second step of forming at least part of the resultant comminuted tissue into a relatively thin-bodied shape having a thickness of between about 1/16 and 3/4 in. and a length at least several times its thickness, thereby avoiding the formation, during subsequent distillation operations, of agglomerates possessing an external layer inhibiting the action of the solvent utilized in said operations; (3) a third step of passing said shape into a water-immiscible fat solvent maintained at about 60°–130° C. under distillation conditions; and (4) a fourth step of distilling water and solvent vapors from said shape and solvent.

2. The invention of claim 1 in which the shape is formed by extruding through a die at least part of the comminuted tissue.

3. The invention of claim 2 in which the shape is continuous.

4. The invention of claim 1 in which the shape is formed by rolling at least part of the comminuted tissue.

5. In a process for simultaneously removing water and fat from animal tissue: (1) a first step of comminuting said tissue; (2) a second step of forming a continuous shape from at least part of the resultant comminuted tissue by extruding said tissue through a die, said shape having a thickness not greater than about 3/4 in., thereby avoiding the formation, during subsequent distillation operations, of agglomerates possessing an external layer inhibiting the action of the solvent utilized in said operations; (3) a third step of continuously passing said shape into a water-immiscible fat solvent maintained at about 60°–130° C. under distillation conditions; and (4) a fourth step of distilling water and solvent vapors from said shape and solvent.

6. The invention of claim 5 in which the shape is a spaghetti-like rod.

7. The invention of claim 5 in which the shape is a ribbon.

8. The invention of claim 5 in which the solvent is a chlorinated hydrocarbon.

9. The invention of claim 8 in which the solvent is perchlorethylene.

10. The invention of claim 8 in which the solvent is trichlorethylene.

11. A process for simultaneously dehydrating and defatting raw animal tissue which comprises: (1) comminuting said tissue; (2) forming the resulting comminuted tissue into a continuous shape having a thickness no greater than 3/4 in., thereby avoiding the formation, during subsequent distillation operations, of agglomerates possessing an external layer inhibiting the action of the solvent utilized in said operations; (3) continuously passing the continuous shape into a water-immiscible fat solvent maintained at about 60°–130° C. under distillations conditions; (4) distilling water and solvent vapors from the shaped tissue and fat solvent while maintaining at least one volume of liquid solvent per volume of shaped tissue treated; and (5) separating the solution of fat dissolved in said solvent resulting from the distillation operations and the treated tissue.

12. A process for simultaneously dehydrating and defatting raw animal tissue which comprises: (1) comminuting said tissue; (2) extruding the resultant comminuted tissue through a die as a plurality of spaghetti-like rods, each having a thickness no greater than 3/4 in., thereby avoiding the formation, during subsequent distillation operations, of agglomerates possessing an external layer inhibiting the action of the solvent utilized in said operations; (3) continuously passing the rods into a chlorinated hydrocarbon solvent maintained at 80°–130° C. under distillation conditions; (4) continuously distilling water and solvent vapors from the rods and solvent while maintaining at least one volume of solvent per volume of tissue treated; and (5) subsequently separating the solution of fat in chlorinated hydrocarbon resulting from the distillation operations and the treated tissue.

13. A process for simultaneously dehydrating and defatting raw animal tissue which comprises: (1) comminuting said tissue; (2) shaping the resultant comminuted tissue into a sheet having a thickness no greater than about 3/4 in., thereby avoiding the formation, during subsequent distillation operations, of agglomerates possessing an external layer inhibiting the action of the solvent utilized in said operations; (3) continuously passing the sheet into a chlorinated hydrocarbon solvent maintained at 80°–130° C. under distillation conditions; (4) continuously distilling water and solvent vapors from the tissue and solvent while maintaining at least one volume of solvent per volume of tissue treated; and (5) subsequently separating the solution of fat in chlorinated hydrocarbon resulting from the distillation operations and the treated tissue.

References Cited in the file of this patent

UNITED STATES PATENTS

| Number | Name | Date |
| --- | --- | --- |
| 2,086,072 | Fauth et al. | July 6, 1937 |
| 2,229,376 | Fauth et al. | Jan. 21, 1941 |
| 2,503,205 | Leaders | Apr. 4, 1950 |
| 2,619,425 | Levin | Nov. 25, 1952 |